United States Patent
Peng et al.

(10) Patent No.: US 11,296,320 B2
(45) Date of Patent: Apr. 5, 2022

(54) SECONDARY BATTERY

(71) Applicant: CONTEMPORARY AMPEREX TECHNOLOGY CO., LIMITED, Ningde (CN)

(72) Inventors: Tianquan Peng, Ningde (CN); Yuliang Shen, Ningde (CN); Meng Kang, Ningde (CN); Jiazheng Wang, Ningde (CN); Libing He, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 124 days.

(21) Appl. No.: 16/395,700

(22) Filed: Apr. 26, 2019

(65) Prior Publication Data
US 2019/0348678 A1   Nov. 14, 2019

(30) Foreign Application Priority Data
May 10, 2018 (CN) .......................... 201810442762.5

(51) Int. Cl.
*H01M 4/583* (2010.01)
*H01M 10/0525* (2010.01)
*H01M 4/02* (2006.01)

(52) U.S. Cl.
CPC ....... *H01M 4/583* (2013.01); *H01M 10/0525* (2013.01); *H01M 2004/021* (2013.01); *H01M 2004/027* (2013.01); *H01M 2004/028* (2013.01)

(58) Field of Classification Search
CPC ........... H01M 4/583; H01M 2004/021; H01M 2004/027; H01M 2004/028; H01M 4/505; H01M 4/133; H01M 4/525; H01M 4/587; H01M 4/131; H01M 4/13; H01M 10/054; H01M 10/0525; Y02E 60/10
See application file for complete search history.

(56) References Cited

U.S. PATENT DOCUMENTS

| | | | | |
|---|---|---|---|---|
| 2004/0161669 A1* | 8/2004 | Zolotnik | ............... | H01M 50/54 |
| | | | | 429/233 |
| 2013/0177792 A1* | 7/2013 | Takahata | ............... | H01M 4/622 |
| | | | | 429/94 |
| 2018/0019472 A1* | 1/2018 | Ikado | .................... | C01B 32/20 |

FOREIGN PATENT DOCUMENTS

| | | | | |
|---|---|---|---|---|
| CN | 101826634 A | 9/2010 | | |
| CN | 102054979 A | 5/2011 | | |
| CN | 102969539 A | 3/2013 | | |
| CN | 103199251 A | 7/2013 | | |
| CN | 103259046 B | 8/2013 | | |
| CN | 104011912 B | 8/2014 | | |
| CN | 104011919 B | 8/2014 | | |
| JP | 2011138680 A | 7/2011 | | |
| JP | 2013004307 A | 1/2013 | | |
| JP | WO2016121711 A1 * | 4/2016 | ............ | H01M 4/587 |
| WO | WO2017104145 A1 | 6/2017 | | |

OTHER PUBLICATIONS

Contemporary Amperex Technology Co., Extended European Search Report, EP19170796.7, dated Jul. 16, 2019, 6 pgs.
Contemporary Amperex Technology Co., Limited, First Office Action, CN201810442762.5, dated Jan. 17, 2019, 9 pgs.

* cited by examiner

*Primary Examiner* — Eli S Mekhlin
(74) *Attorney, Agent, or Firm* — Morgan, Lewis & Bockius LLP

(57) ABSTRACT

The present disclosure provides a secondary battery, the secondary battery comprises a positive electrode plate, a negative electrode plate, a separator and an electrolyte, the positive electrode plate comprises a positive current collector and a positive film, the positive film is provided on at least one surface of the positive current collector and comprises a positive active material, the negative electrode plate comprises a negative current collector and a negative film, the negative film is provided on at least one surface of the negative current collector and comprises a negative active material, the negative active material comprises graphite, and an average particle diameter of the positive active material represented by D50 and a thickness of the negative film represented by $H_n$ satisfy a relationship: $6 \leq 0.06 H_n \times (4-1/D50) \leq 31$. The battery of the present disclosure has the characteristics of excellent dynamics performance and long cycle life at the same time.

9 Claims, No Drawings

SECONDARY BATTERY

CROSS-REFERENCE TO RELATED APPLICATIONS

The present application claims priority to Chinese patent application No. CN201810442762.5, filed on May 10, 2018, which is incorporated herein by reference in its entirety.

FIELD OF THE PRESENT DISCLOSURE

The present disclosure relates to the field of battery, and particularly relates to a secondary battery.

BACKGROUND OF THE PRESENT DISCLOSURE

Rechargeable batteries are widely used in new energy automotives due to significant characteristics of light weight, high energy density, no pollution, none memory effect, long service life and the like. A charging/discharging process of the rechargeable battery is realized by the intercalation and the deintercalation of the active ions (such as lithium ions and the like) between the positive active material and the negative active material, therefore the design of the positive active material, the design of the negative active material, the design of the positive electrode plate and the design of the negative electrode plate will directly affect the performance of the battery. Specifically, whether the positive active material, the negative active material, the positive electrode plate and the negative electrode plate are reasonably designed will affect the charging speed, the energy density, the cycle performance and the storage performance of the battery.

At present, the common problem existed in the design field of the electrode plate is that only one certain parameter of the electrode plate (i.e. the positive electrode plate or the negative electrode plate) is concerned, such as the per unit area coating weight, the pressing density and the like, however, the improvement on the performance of the battery is not obvious when only one certain parameter of the electrode plate is improved.

SUMMARY OF THE PRESENT DISCLOSURE

In view of the problem existing in the background, an object of the present disclosure is to provide a secondary battery, the battery has the characteristics of excellent dynamics performance and long cycle life at the same time.

In order to achieve the above object, the present disclosure provides a secondary battery, which comprises a positive electrode plate, a negative electrode plate, a separator and an electrolyte, the positive electrode plate comprises a positive current collector and a positive film, the positive film is provided on at least one surface of the positive current collector and comprises a positive active material, the negative electrode plate comprises a negative current collector and a negative film, the negative film is provided on at least one surface of the negative current collector and comprises a negative active material. The negative active material comprises graphite, and an average particle diameter of the positive active material represented by D50 and a thickness of the negative film represented by $H_n$ satisfy a relationship: $6 \leq 0.06 H_n \times (4-1/D50) \leq 31$. A unit of the average particle diameter of the positive active material represented by D50 is μm and a unit of the thickness of the negative film represented by $H_n$ is μm.

Compared with the existing technologies, the present disclosure at least includes the following beneficial effects: in the present disclosure, by reasonably matching the relationship among the parameters of the positive active material, the parameters of the negative active material, the parameters of the positive negative electrode plate and the parameters of the negative electrode, the speed of the active ions deintercalating from the positive active material and the speed of the active ions intercalating into the negative active material are reasonably matched, therefore the battery having the characteristics of excellent dynamics performance and long cycle life at the same time can be obtained.

DETAILED DESCRIPTION

Hereinafter a secondary battery according to the present disclosure is described in detail.

The secondary battery of the present disclosure comprises a positive electrode plate, a negative electrode plate, a separator and an electrolyte, the positive electrode plate comprises a positive current collector and a positive film, the positive film is provided on at least one surface of the positive current collector and comprises a positive active material, the negative electrode plate comprises a negative current collector and a negative film, the negative film is provided on at least one surface of the negative current collector and comprises a negative active material. The negative active material comprises graphite, and an average particle diameter of the positive active material represented by D50 and a thickness of the negative film represented by $H_n$ satisfy a relationship: $6 \leq 0.06 H_n \times (4-1/D50) \leq 31$. A unit of the average particle diameter of the positive active material represented by D50 is μm and a unit of the thickness of the negative film represented by $H_n$ is μm.

The charging/discharging process of the battery actually is a transferring process of the active ions (such as the lithium ions, the sodium-ions and the like) transferred between the positive active material and the negative active material, playing of respective performances of the positive electrode plate and the negative electrode plate and the reasonable match between the positive electrode plate and the negative electrode plate both are important parts in the design of the battery. The average particle diameter of the positive active material is related to the deintercalation speed of the active ions and the dynamics performance of the positive electrode plate, generally, the smaller the average particle diameter of the positive active material is, the faster the deintercalation speed of the active ions is, and the better the dynamics performance of the positive electrode plate is. The thickness of the negative film is related to the intercalation speed of the active ions and the polarization degree of the negative electrode plate, therefore the thickness of the negative film will affect the dynamics performance and the cycle performance of the negative electrode plate. The active ions are deintercalated from the positive active material and then intercalated into the negative active material during the charging process of the battery, the matching between the speed of the active ions deintercalating from the positive active material and the speed of the active ions intercalating into the negative active material is very important during the charging process of the battery. If the active ions are deintercalated from the positive active material with a fast speed, but the negative active material does not have the capability to timely accept all the active ions, the dynamics performance and the cycle performance of the battery will both be worse.

In the design of the battery of the present disclosure, by comprehensively considering the relationship between the average particle diameter of the positive active material represented by D50 and the thickness of the negative film represented by $H_n$ and making them satisfy a relationship $6 \leq 0.06 H_n \times (4-1/D50) \leq 31$ can make the battery have the characteristics of excellent dynamics performance and long cycle life at the same time.

When the average particle diameter of the positive active material represented by D50 is smaller or the thickness of the negative film represented by $H_n$ is smaller so as to make a lower limit value of $0.06 H_n \times (4-1/D50)$ be less than 6, the processing process and the preparation process of the battery become difficult and the energy density of the battery is very low. When the average particle diameter of the positive active material represented by D50 is larger or the thickness of the negative film represented by $H_n$ is larger so as to make an upper limit value of $0.06 H_n \times (4-1/D50)$ be more than 31, the thicker negative film affects the intercalation of the active ions, therefore the active ions are easily reduced and precipitated on the negative electrode plate so as to affect the dynamics performance and the cycle performance of the battery.

Preferably, the average particle diameter of the positive active material represented by D50 and the thickness of the negative film represented by $H_n$ satisfy a relationship: $8 \leq 0.06 H_n \times (4-1/D50) \leq 20$.

Furthermore, a morphology of the porous structure of the negative film will also affect the dynamics performance of the negative electrode plate, the developed the porous structure of the negative film is, the stronger the retention capability of the porous negative electrode plate on the electrolyte is, that is the more sufficient the electrolyte in the porous structure of the negative film is. As the charging/discharging process of the battery continues, the negative active material is repeatedly expanded and contracted, continuous reflux and extrusion of the electrolyte in the porous negative electrode plate is accompanied by during this process; and the more sufficient the electrolyte in the porous structure of the negative film is, the easier the reflux and the extrusion of the electrolyte is, the smaller the polarization during the charging/discharging process of the battery is, and the more beneficial for improving the charging speed of the battery is. The morphology of the porous structure of the negative film can be characterized by the pressing density of the negative film, the higher the pressing density of the negative film is, the more dense the porous structure of the negative film is, the more difficult the infiltration of the electrolyte is, the larger the liquid phase conduction resistance of the active ions inside the porous structure of the negative film is, and the worse the dynamics performance of the negative electrode plate is.

The orientation of the negative film will also affect the dynamics performance of the negative electrode plate, generally, when the active ions pass through the SEI membrane on the surface of the negative film and enter into the negative film, it will be affected by the orientation of the active ion intercalating channels inside the negative film, and the better the isotropy of the negative film is, the larger the amount of the active ion intercalating channels inside the negative film is, the easier the intercalation process of the active ion is, and the better the dynamics performance of the negative electrode plate and the dynamics performance of the battery are. The orientation of all the active ion intercalating channels inside the negative film can be characterized by the OI value of the negative film, generally, the OI value of the negative film is larger, the active material particles in the negative film tend to be distributed parallel to the negative current collector, therefore the amount of the active ion intercalating channels inside the negative film is smaller, and the dynamics performance of the negative electrode plate and the dynamics performance of the battery are both worse.

In the design of the battery of the present disclosure, by comprehensively considering the relationship between the pressing density of the negative film represented by PD and the OI value of the negative film represented by $V_{OI}$ and making them satisfy a relationship $0.2 \leq (PD+0.13 \times V_{OI})/9.2 \leq 1.3$, the dynamics performance and the cycle performance of the battery can be further improved, and the battery can bear a larger charging speed. The pressing density of the negative film represented by PD has a unit of g/cm$^3$.

When the pressing density of the negative film represented by PD is larger or the OI value of the negative film represented by $V_{OI}$ is larger so as to make an upper limit value of $(PD+0.13 \times V_{OI})/9.2$ be more than 1.3, the amount of the active ion intercalating channels inside the negative film is smaller, the active material particles in the negative film tend to be distributed parallel to the negative current collector, therefore the dynamics performance of the battery is worse; and moreover, the larger pressing density of the negative film makes the porous structure of the negative film more dense, the infiltration of the electrolyte is more difficult, the liquid phase conduction resistance of the active ions in the porous structure of the negative film is larger, therefore the improvement on the dynamics performance and the cycle performance of the battery is affected.

When the pressing density of the negative film represented by PD is smaller or the OI value of the negative film represented by $V_{OI}$ is smaller so as to make a lower limit value of $(PD+0.13 \times V_{OI})/9.2$ be less than 0.2, the active material particles in the negative film tend to be randomly distributed, the amount of the active ion intercalating channels inside the negative film is larger, the porous structure of the negative film is very developed, and the dynamics performance of the negative electrode plate is better; however, the electronic conductivity of the negative electrode plate is affected, the charge exchange speed between the active ions and the electrons is slower, the negative electrode plate also has the risk of exfoliation of the negative film and wrinkling, therefore the improvement on the dynamics performance and the cycle performance of the battery is also affected.

Preferably, the pressing density of the negative film represented by PD and the OI value of the negative film represented by $V_{OI}$ satisfy a relationship: $0.3 \leq (PD+0.13 \times V_{OI})/9.2 \leq 0.8$.

In the secondary battery of the present disclosure, preferably, the average particle diameter of the positive active material represented by D50 is 0.5 μm~15 μm; further preferably, the average particle diameter of the positive active material represented by D50 is 3 μm~9 μm.

In the secondary battery of the present disclosure, the negative film is provided on one of the surfaces of the negative current collector or the negative film is provided on both surfaces of the negative current collector. Preferably, the thickness of the negative film represented by $H_n$ is 25 μm~150 μm; further preferably, the thickness of the negative film represented by $H_n$ is 35 μm~125 μm. The thickness of the negative film represented by $H_n$ in the present disclosure refers to the thickness of the negative film on one surface of the negative current collector.

In the secondary battery of the present disclosure, preferably, the pressing density of the negative film represented by PD is 0.8 g/cm$^3$~2.0 g/cm$^3$; further preferably, the pressing density of the negative film represented by PD is 1.0 g/cm$^3$~1.6 g/cm$^3$.

In the secondary battery of the present disclosure, preferably, the OI value of the negative film represented by $V_{OI}$ is 1~150; further preferably, the OI value of the negative film represented by $V_{OI}$ is 8~70.

It should be noted that, an OI value of a powder of the negative active material will affect the OI value of the negative film represented by $V_{OI}$ to an extent, therefore the desired OI value of the negative film represented by $V_{OI}$ may be obtained by changing the OI value of the powder of the negative active material; the OI value of the negative film represented by $V_{OI}$ may also be changed by using magnetic field inducing technique during the coating process of the negative slurry so as to artificially induce the arrangement of the negative active materials in the negative electrode plate; the OI value of the negative film represented by $V_{OI}$ may also be changed by adjusting the pressing density of the negative film during the cold pressing process so as to change the arrangement of the negative active materials in the negative electrode plate.

Preferably, the OI value of the powder of the negative active material represented by $G_{OI}$ is 0.5~7; further preferably, the OI value of the powder of the negative active material represented by $G_{OI}$ is 2~4.5.

In the secondary battery of the present disclosure, the graphite may be one or more selected from a group consisting of artificial graphite and natural graphite.

In the secondary battery of the present disclosure, the negative active material may further comprise one or more selected from a group consisting of soft carbon, hard carbon, carbon fiber, mesocarbon microbeads, silicon-based material, tin-based material and lithium titanate besides the graphite. Preferably, the silicon-based material may be elemental silicon, silicon oxide, silicon carbon composite and silicon alloy; the tin-based material may be elemental tin, tin oxide compound and tin alloy.

In the secondary battery of the present disclosure, the average particle diameter of the positive active material represented by D50 may be obtained by a laser diffraction particle size analyzer (Mastersizer 3000), a volume particle size distribution is obtained according to the particle size analysis-laser diffraction method (specifically referring to GB/T19077-2016), and the average particle diameter is represented by the median value D50 in the volume particle size distribution.

The thickness of the negative film represented by $H_n$ may be obtained by an 1/10 micrometer. It should be noted that, the thickness of the negative film in the present disclosure refers to the thickness of the negative film of the negative electrode plate after being cold pressed and using for assembling the battery.

The OI value of the negative film represented by $V_{OI}$ may be obtained by a X-ray powder diffractometer (X'pert PRO), a X-ray diffraction pattern is obtained according to the general rules for X-ray diffractometric analysis JIS K 0131-1996 and the determination method of artificial graphite lattice parameter JB/T4220-2011, $V_{OI}=C_{004}/C_{110}$, $C_{004}$ represents characteristic diffraction peak area of (004) crystal plane, $C_{100}$ represents characteristic diffraction peak area of (110) crystal plane.

The pressing density of the negative film is obtained according to an equation PD=the mass on per unit area negative film (g/cm$^2$)/the thickness of the negative film (cm). The mass on per unit area negative film may be obtained by a standard balance, and the thickness of the negative film may be obtained by a 1/10 micrometer.

In the secondary battery of the present disclosure, the negative film further comprises a conductive agent and a binder, the types and the contents of the conductive agent and the binder are not specifically limited and may be selected based on actual demands. The type of the negative current collector is not specifically limited and may be selected based on actual demands, and preferably, the negative current collector is a copper foil.

In the secondary battery of the present disclosure, the positive film further comprises a conductive agent and a binder, the types and the contents of the conductive agent and the binder are not specifically limited and may be selected based on actual demands. The type of the positive current collector is not specifically limited and may be selected based on actual demands, and preferably, the positive current collector is an aluminum foil.

It should be noted that, the secondary battery of the present disclosure may be a lithium-ion battery or a sodium-ion battery.

Specifically, when the secondary battery is the lithium-ion battery, the positive active material may be selected from lithium cobalt oxide, lithium nickel oxide, lithium manganese oxide, lithium nickel manganese oxide, lithium nickel cobalt manganese oxide, lithium nickel cobalt aluminum oxide and olivine-type lithium-containing phosphate, but the present disclosure is not limited to these materials, other conventionally known materials that can be used as the positive active material of the lithium-ion battery can also be used. These positive active materials may be used alone or may be used two or more of them in combination. Preferably, the positive active material may be one or more selected from a group consisting of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ and $LiMnPO_4$.

Specifically, when the secondary battery is the sodium-ion battery, the positive active material may be selected from transition metal oxide $Na_xMO_2$ (M represents transition metal, preferably, M is one or more selected from a group consisting of Mn, Fe, Ni, Co, V, Cu and Cr, $0<x\le1$), polyanion-type material (phosphate-type, fluorophosphate-type, pyrophosphate-type and sulfate-type) and prussian blue material, but the present disclosure is not limited to these materials, other conventionally known materials that can be used as the positive active material of the sodium-ion battery can also be used. These positive active materials may be used alone or may be used two or more of them in combination. Preferably, the positive active material may be one or more selected from a group consisting of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, prussian blue material and a material with a general formula of $A_aM_b(PO_4)_cO_xY_{3-x}$ (A is one or more selected from a group consisting of H$^+$, Li$^+$, Na$^+$, K$^+$ and NH$_4^+$; M represents transition metal cation, preferably, M is one or more selected from a group consisting of V, Ti, Mn, Fe, Co, Ni, Cu and Zn; Y represents anion of halogen, preferably, Y is one or more selected from a group consisting of F, Cl and Br; $0<a\le4$, $0<b\le2$, $1\le c\le3$, $0\le x\le2$).

In the secondary battery of the present disclosure, the specific type and the specific composition of the separator and the electrolyte are not specifically limited and may be selected based on actual demands.

Hereinafter the present disclosure will be described in detail in combination with examples. It should be noted that, the examples described in the present disclosure are only used for explaining the present disclosure, and are not intended to limit the present disclosure.

Batteries of examples 1-41 and comparative examples 1-6 were all prepared in accordance with the following preparation method.

(1) Preparation of a Positive Electrode Plate

NCM523 (positive active material), acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on both surfaces of aluminum foil (positive current collector), drying was then performed under room temperature and continual drying was performed in an oven, which was then followed by cold pressing and plate cutting, finally the positive electrode plate was obtained.

(2) Preparation of a Negative Electrode Plate

Graphite or a mixer of graphite and other active materials with a certain mass ratio (negative active material), acetylene black (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on both surfaces of copper foil (negative current collector), drying was then performed under room temperature and continual drying was performed in an oven, which was then followed by cold pressing and plate cutting, finally the negative electrode plate was obtained.

(3) Preparation of an Electrolyte

Ethylene carbonate (EC), ethyl methyl carbonate (EMC) and diethyl carbonate (DEC) according to a volume ratio of 1:1:1 were mixed together to obtain an organic solvent, then sufficiently dried $LiPF_6$ (lithium salt) was dissolved into the mixed organic solvent to obtain an electrolyte, and a concentration of the electrolyte was 1 mol/L.

(4) Preparation of a Separator

The separator was a polyethylene membrane.

(5) Preparation of a Lithium-Ion Battery

The positive electrode plate, the separator and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to form an electrode assembly, then the electrode assembly was put into a case, which was followed by baking, electrolyte injection, vacuum packaging, standby, formation, shaping and the like, finally a lithium-ion battery was obtained.

Hereinafter test processes of the lithium-ion batteries were described.

(1) Testing of the Dynamics Performance:

At 25° C., the lithium-ion batteries prepared in the examples and the comparative examples were fully charged at a constant current of 4 C and fully discharged at a constant current of 1 C for 10 cycles, then the lithium-ion batteries were fully charged at a constant current of 4 C, then the negative electrode plates were disassembled from the lithium-ion batteries, and the lithium precipitation on the surface of each negative electrode plate was observed. The lithium-precipitation area of less than 5% was considered to be slight lithium precipitation, the lithium-precipitation area of 5% to 40% was considered to be moderate lithium precipitation, and the lithium-precipitation area of more than 40% was considered to be serious lithium precipitation.

(2) Testing of the Cycle Performance:

At 25° C., the lithium-ion batteries prepared in the examples and the comparative examples were charged at a constant current of 3 C and discharged at a constant current of 1 C, the fully charging/discharging cycle process was repeated until the capacity of the lithium-ion battery decayed to 80% of the initial capacity, and the cycle number of the lithium-ion battery was recorded.

TABLE 1

Parameters and test results of examples 1-41 and comparative examples 1-6

| | D50 of positive active material (μm) | Negative film Active material | $H_n$ (μm) | PD (g/cm³) | $V_{OI}$ | $0.06H_n \times (4 - 1/D50)$ | $0.13 \times V_{OI}/9.2$ | (PD + Negative lithium precipitation | Cycle number |
|---|---|---|---|---|---|---|---|---|---|
| Example 1 | 7.2 | graphite | 26 | 1.40 | 20.0 | 6.0 | 0.43 | slight lithium precipitation | 2865 |
| Example 2 | 7.2 | graphite | 35 | 1.40 | 20.0 | 8.1 | 0.43 | no lithium precipitation | 3458 |
| Example 3 | 7.2 | graphite | 42 | 1.40 | 20.0 | 9.7 | 0.43 | no lithium precipitation | 3963 |
| Example 4 | 7.2 | graphite | 54 | 1.40 | 20.0 | 12.5 | 0.43 | no lithium precipitation | 3543 |
| Example 5 | 7.2 | graphite | 62 | 1.40 | 20.0 | 14.4 | 0.43 | no lithium precipitation | 2988 |
| Example 6 | 7.2 | graphite | 84 | 1.40 | 20.0 | 19.5 | 0.43 | no lithium precipitation | 2875 |
| Example 7 | 7.2 | graphite | 112 | 1.40 | 20.0 | 25.9 | 0.43 | slight lithium precipitation | 1765 |
| Example 8 | 7.2 | graphite | 132 | 1.40 | 20.0 | 30.6 | 0.43 | slight lithium precipitation | 1431 |

TABLE 1-continued

Parameters and test results of examples 1-41 and comparative examples 1-6

| | D50 of positive active material (μm) | Negative film Active material | $H_n$ (μm) | PD (g/cm³) | $V_{OI}$ | $0.06 H_n \times (4 - 1/D50)$ | $0.13 \times V_{OI}/9.2$ | (PD + Negative lithium precipitation | Cycle number |
|---|---|---|---|---|---|---|---|---|---|
| Example 9 | 4.7 | graphite | 39 | 1.03 | 4.0 | 8.9 | 0.17 | slight lithium precipitation | 1856 |
| Example 10 | 4.7 | graphite | 39 | 1.05 | 8.0 | 8.9 | 0.23 | slight lithium precipitation | 2311 |
| Example 11 | 4.7 | graphite | 39 | 1.17 | 12.0 | 8.9 | 0.30 | no lithium precipitation | 2452 |
| Example 12 | 4.7 | graphite | 39 | 1.25 | 22.0 | 8.9 | 0.45 | no lithium precipitation | 3100 |
| Example 13 | 4.7 | graphite | 39 | 1.40 | 31.0 | 8.9 | 0.59 | no lithium precipitation | 3121 |
| Example 14 | 4.7 | graphite | 39 | 1.52 | 42.0 | 8.9 | 0.76 | no lithium precipitation | 2976 |
| Example 15 | 4.7 | graphite | 39 | 1.60 | 54.0 | 8.9 | 0.94 | no lithium precipitation | 2851 |
| Example 16 | 4.7 | graphite | 39 | 1.58 | 68.0 | 8.9 | 1.13 | slight lithium precipitation | 2198 |
| Example 17 | 4.7 | graphite | 39 | 1.59 | 75.0 | 8.9 | 1.23 | slight lithium precipitation | 2410 |
| Example 18 | 4.7 | graphite | 39 | 1.60 | 82.0 | 8.9 | 1.33 | moderate lithium precipitation | 1345 |
| Example 19 | 3.4 | graphite | 65 | 1.05 | 9.6 | 14.5 | 0.25 | no lithium precipitation | 2340 |
| Example 20 | 4.5 | graphite | 67 | 1.09 | 13.6 | 15.2 | 0.31 | no lithium precipitation | 3654 |
| Example 21 | 5.3 | graphite | 71 | 1.17 | 20.7 | 16.2 | 0.42 | no lithium precipitation | 2280 |
| Example 22 | 7.2 | graphite | 73 | 1.21 | 26.8 | 16.9 | 0.51 | no lithium precipitation | 3455 |
| Example 23 | 4.3 | graphite | 76 | 1.22 | 31.7 | 17.2 | 0.58 | no lithium precipitation | 3057 |
| Example 24 | 4.7 | graphite | 77 | 1.25 | 35.0 | 17.5 | 0.63 | no lithium precipitation | 4028 |
| Example 25 | 5.2 | graphite | 80 | 1.32 | 37.3 | 18.3 | 0.67 | no lithium precipitation | 2877 |
| Example 26 | 5.7 | graphite | 82 | 1.38 | 42.5 | 18.8 | 0.75 | no lithium precipitation | 3219 |
| Example 27 | 7.2 | graphite | 84 | 1.40 | 47.3 | 19.5 | 0.82 | no lithium precipitation | 2122 |
| Example 28 | 6.4 | graphite | 89 | 1.52 | 54.1 | 20.5 | 0.93 | slight lithium precipitation | 1879 |
| Example 29 | 8.5 | graphite | 92 | 1.55 | 60.3 | 21.4 | 1.02 | slight lithium precipitation | 2003 |
| Example 30 | 6.5 | graphite | 99 | 1.56 | 68.0 | 22.8 | 1.13 | slight lithium precipitation | 1786 |
| Example 31 | 7.3 | graphite | 102 | 1.58 | 76.3 | 23.6 | 1.25 | slight lithium precipitation | 1567 |
| Example 32 | 1.1 | graphite | 82 | 1.42 | 10.6 | 15.2 | 0.30 | no lithium precipitation | 2314 |
| Example 33 | 2.3 | graphite | 91 | 1.38 | 14.5 | 19.5 | 0.35 | no lithium precipitation | 2534 |
| Example 34 | 11.2 | graphite | 67 | 1.65 | 24.3 | 15.7 | 0.52 | no lithium precipitation | 2134 |
| Example 35 | 13.4 | graphite | 82 | 1.56 | 15.8 | 19.3 | 0.39 | no lithium precipitation | 2011 |
| Example 36 | 14.2 | graphite | 74 | 1.32 | 16.4 | 17.4 | 0.38 | no lithium precipitation | 2876 |
| Example 37 | 20.2 | graphite | 68 | 1.65 | 32.1 | 16.1 | 0.63 | no lithium precipitation | 2098 |
| Example 38 | 0.5 | graphite | 161 | 1.65 | 32.1 | 19.3 | 0.63 | no lithium precipitation | 2309 |
| Example 39 | 4.3 | graphite + soft carbon (7:3) | 77 | 1.23 | 16.7 | 17.4 | 0.37 | no lithium precipitation | 2407 |

TABLE 1-continued

Parameters and test results of examples 1-41 and comparative examples 1-6

| | D50 of positive active material (μm) | Negative film Active material | $H_n$ (μm) | PD (g/cm³) | $V_{OI}$ | $0.06H_n \times (4 - 1/D50)$ | $0.13 \times V_{OI}/9.2$ | (PD + Negative lithium precipitation | Cycle number |
|---|---|---|---|---|---|---|---|---|---|
| Example 40 | 7.6 | graphite + hard carbon (7:3) | 67 | 1.15 | 16.0 | 15.6 | 0.35 | no lithium precipitation | 2497 |
| Example 41 | 5.3 | graphite + lithium titanate (7:3) | 74 | 1.78 | 7.2 | 16.9 | 0.30 | no lithium precipitation | 2309 |
| Comparative example 1 | 0.4 | graphite | 61 | 1.40 | 20.0 | 5.5 | 0.43 | moderate lithium precipitation | 598 |
| Comparative example 2 | 25 | graphite | 135 | 1.40 | 20.0 | 32.1 | 0.43 | slight lithium precipitation | 906 |
| Comparative example 3 | 4.1 | graphite | 160 | 1.40 | 20.0 | 36.1 | 0.43 | moderate lithium precipitation | 756 |
| Comparative example 4 | 13.2 | graphite | 20 | 1.40 | 20.0 | 4.7 | 0.43 | serious lithium precipitation | 453 |
| Comparative example 5 | 9 | graphite | 135 | 1.40 | 20.0 | 31.5 | 0.43 | serious lithium precipitation | 234 |
| Comparative example 6 | 1.1 | graphite | 30 | 1.40 | 20.0 | 5.6 | 0.43 | serious lithium precipitation | 397 |

It could be seen from the test results of Table 1, the batteries of examples 1-41 had the characteristics of excellent dynamics performance and long cycle life, this was because the positive active material, the negative active material, the positive electrode plate and the negative electrode plate had a good matching relationship, the speed of the lithium ions deintercalating from the positive active material and the speed of the lithium ions intercalating into the negative active material were reasonably matched, the demands of the battery on a a large rate and a fast speed could be met, therefore the battery might have excellent dynamics performance and the battery might also have long cycle life while charged under a large rate and a fast speed.

Examples 1-8 illustrated the test results where the average particle diameter of the positive active material represented by D50 was constant as 7.2 μm, when the thickness of the negative film represented by $H_n$ was adjusted to make the value of $0.06H_n \times (4-1/D50)$ be between 6 and 31, the battery might have the characteristics of excellent dynamics performance and long cycle life at the same time. Preferably, the value $0.06H_n \times (4-1/D50)$ was between 8 and 20.

When the average particle diameter of the positive active material represented by D50 was smaller or the thickness of the negative film represented by $H_n$ was smaller so as to make the lower limit value of $0.06H_n \times (4-1/D50)$ be less than 6, the capacity performance of the battery while charged under a large rate and a fast speed was worse, the dynamics performance of the battery was worse, and the energy density of the battery was also very low. When the average particle diameter of the positive active material represented by D50 was larger or the thickness of the negative film represented by $H_n$ was larger so as to make the upper limit value of $0.06H_n \times (4-1/D50)$ be more than 31, the thicker negative film affected the intercalation of the lithium ions, therefore the lithium ions were easily reduced and precipitated on the negative electrode plate, which would also affect the dynamics performance and the cycle performance of the battery.

The preferred range of the average particle diameter of the positive active material represented by D50 was 0.5 μm~15 μm, the preferred range of the thickness of the negative film represented by $H_n$ was 25 μm~150 μm. And what the applicant needed to explain was, when one or two of the average particle diameter of the positive active material represented by D50 and the thickness of the negative film represented by $H_n$ did not fall within the above preferred ranges, but the value of $0.06H_n \times (4-1/D50)$ was between 6 and 31, the battery might still have the characteristics of excellent dynamics performance and long cycle life at the same time. For example, in example 37 and example 38, the average particle diameter of the positive active material represented by D50 and the thickness of the negative film represented by $H_n$ both did not fall within the above preferred ranges, but by reasonably adjusting the relationship between the average particle diameter of the positive active material represented by D50 and the thickness of the negative film represented by $H_n$ and making the value of $0.06H_n \times (4-1/D50)$ be between 6 and 31, the speed of the lithium ions deintercalating from the positive active material and the speed of the lithium ions intercalating into the negative active material might be reasonably matched, and the battery might still have the characteristics of excellent dynamics performance and long cycle life at the same time. When the average particle diameter of the positive active material represented by D50 and the thickness of the negative film represented by $H_n$ both fell within the above preferred ranges, but the value of $0.06H_n \times (4-1/D50)$ was not between 6 and 31, the dynamics performance and the cycle performance of the battery were both worse. The thickness of the negative film represented by $H_n$ was too larger compared to the average particle diameter of the positive active material represented by D50 in comparative example 5, the intercalation of the lithium ions was seriously affected, serious lithium precipitation occurred on the negative electrode plate, and the dynamics performance and the cycle performance of the battery were both worse. The thickness of the negative film represented by $H_n$ and the average particle diameter of the positive active material represented by D50 in comparative example 6 were both very small, the lithium ions could deintercalate from the positive active material with a fast speed, however, the thinner negative film did not have the capability to timely accept all the lithium ions deintercalating from the positive active material, part of the lithium ions would be reduced and precipitated on the surface of the negative electrode plate, serious lithium precipitation occurred on the negative electrode plate, and the dynamics performance and the cycle performance of the battery were both worse.

Examples 9-18 further adjusted the relationship between the pressing density of the negative film represented by PD and the OI value of the negative film represented by $V_{OI}$, and when they satisfied a relationship $0.2 \leq (PD+0.13 \times V_{OI})/9.2 \leq 1.3$, the dynamics performance and the cycle performance of the battery could be further improved.

When the pressing density of the negative film represented by PD and the OI value of the negative film represented by $V_{OI}$ were unreasonably designed and the upper limit value of $(PD+0.13 \times V_{OI})/9.2$ was more than 1.3, the larger OI value of the negative film made the negative active material particles tend to be distributed parallel to the negative current collector, the amount of the lithium ion intercalating channels inside the negative film was smaller, and the dynamics performance of the negative electrode plate was worse; and moreover, the larger pressing density of the negative film made the porous structure of the negative film more dense, the infiltration of the electrolyte was more difficult, the liquid phase conduction resistance of the lithium ions in the porous structure of the negative film was larger, the dynamics performance of the negative electrode plate was further deteriorated, therefore the improvement on the dynamics performance and the cycle performance of the battery was affected. When the pressing density of the negative film represented by PD and the OI value of the negative film represented by $V_{OI}$ were unreasonably designed and the lower limit value of $(PD+0.13 \times V_{OI})/9.2$ was less than 0.2, the smaller OI value of the negative film made the negative active material particles tend to be randomly distributed, the amount of the lithium ion intercalating channels inside the negative film was larger, the porous structure of the negative film was very developed, the dynamics performance of the negative electrode plate was better; however, the electronic conductivity of the negative electrode plate was affected, the charge exchange speed between the lithium ions and the electrons was slower, therefore the improvement on the dynamics performance and the cycle performance of the battery was also affected. The dynamics performance and the cycle performance of the batteries prepared in example 9 and example 18 were slightly worse than that of the batteries prepared in examples 10-17.

What is claimed:

1. A secondary battery comprising a positive electrode plate, a negative electrode plate, a separator and an electrolyte, the positive electrode plate comprising a positive current collector and a positive film, the positive film being provided on at least one surface of the positive current collector and comprising a positive active material, the negative electrode plate comprising a negative current collector and a negative film, the negative film being provided on at least one surface of the negative current collector and comprising a negative active material;
   wherein
   the negative active material comprises graphite, and an average particle diameter of the positive active material represented by D50 and a thickness of the negative film represented by $H_n$ satisfy a relationship: $8 \leq 0.06 H_n \times (4-1/D50) \leq 20$;
   a unit of the average particle diameter of the positive active material represented by D50 is μm, a unit of the thickness of the negative film represented by $H_n$ is μm; and
   a pressing density of the negative film represented by PD and an OI value of the negative film represented by $V_{OI}$ satisfy a relationship: $0.3 \leq (PD+0.13 \times V_{OI})/9.2 \leq 0.63$, and a unit of the pressing density of the negative film represented by PD is g/cm$^3$; and
   the pressing density of the negative film represented by PD is $0.8 \text{ g/cm}^3 \leq PD \leq 1.25 \text{ g/cm}^3$.

2. The secondary battery according to claim 1, wherein the average particle diameter of the positive active material represented by D50 is 0.5 μm-15 μm.

3. The secondary battery according to claim 2, wherein the average particle diameter of the positive active material represented by D50 is 3 μm-9 μm.

4. The secondary battery according to claim 1, wherein the OI value of the negative film represented by $V_{OI}$ is 1-150.

5. The secondary battery according to claim 4, wherein the OI value of the negative film represented by $V_{OI}$ is 8-70.

6. The secondary battery according to claim 1, wherein an OI value of a powder of the negative active material represented by $G_{OI}$ is 0.5-7.

7. The secondary battery according to claim 6, wherein the OI value of the powder of the negative active material represented by $G_{OI}$ is 2-4.5.

8. The secondary battery according to claim 1, wherein the negative active material further comprises one or more selected from a group consisting of soft carbon, hard carbon, carbon fiber, mesocarbon microbeads, silicon-based material, tin-based material and lithium titanate.

9. The secondary battery according to claim 1, wherein the thickness of the negative film represented by $H_n$ is 25 μm-42 μm.

* * * * *